United States Patent
Lu et al.

(10) Patent No.: US 12,074,710 B2
(45) Date of Patent: Aug. 27, 2024

(54) USER EQUIPMENT AND METHOD OF HYBRID AUTOMATIC REPEAT REQUEST OPTION CONFIGURATION OF SAME

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 373 days.

(21) Appl. No.: 17/523,774

(22) Filed: Nov. 10, 2021

(65) Prior Publication Data

US 2022/0085922 A1 Mar. 17, 2022

Related U.S. Application Data

(63) Continuation of application No. PCT/CN2020/110397, filed on Aug. 21, 2020.

(60) Provisional application No. 62/891,569, filed on Aug. 26, 2019.

(51) Int. Cl.
*H04L 1/1812* (2023.01)
*H04W 28/02* (2009.01)
*H04W 28/04* (2009.01)
*H04W 72/20* (2023.01)

(52) U.S. Cl.
CPC ....... *H04L 1/1812* (2013.01); *H04W 28/0268* (2013.01); *H04W 28/04* (2013.01); *H04W 72/20* (2023.01)

(58) Field of Classification Search
CPC ................ H04L 1/1812; H04W 28/0268; H04W 28/04; H04W 72/20
See application file for complete search history.

(56) References Cited

U.S. PATENT DOCUMENTS

| 2012/0039280 | A1 | 2/2012 | Chen et al. |
| 2013/0279441 | A1 | 10/2013 | Lee et al. |
| 2019/0037622 | A1* | 1/2019 | Blasco Serrano .... H04W 72/23 |
| 2020/0145876 | A1* | 5/2020 | Dao .................... H04L 12/1407 |
| 2022/0159649 | A1* | 5/2022 | Ko ........................ H04W 72/21 |
| 2022/0182979 | A1* | 6/2022 | Freda .................. H04W 72/56 |
| 2022/0304001 | A1* | 9/2022 | Lee ................. H04W 72/0446 |

(Continued)

FOREIGN PATENT DOCUMENTS

WO 2017078454 A1 5/2017

OTHER PUBLICATIONS

Request for CNIPA Patent Priority Review issued in corresponding Chinese Application No. 202110578714.0, mailed Jun. 24, 2022, 4 pages.

(Continued)

*Primary Examiner* — Michael A Keller
(74) *Attorney, Agent, or Firm* — BAYES PLLC

(57) ABSTRACT

A user equipment and a method for hybrid automatic repeat request (HARQ) option configuration of the same are provided. The method includes deriving at least one HARQ feedback option based on at least one of the followings: group-related information from an upper layer, a radio resource control (RRC) state of the user equipment, or a coverage status of the user equipment.

18 Claims, 4 Drawing Sheets

User Equipment

Acquire group-related information from an upper layer

Derive HARQ option configuration according to the group-related information, wherein the group-related information comprises whether a number of user equipments in a groupcast communication is known or not Select HARQ-NACK only option when the number of user equipments is unknown Select HARQ-NACK/ACK option when the number of user equipments is known

(56) References Cited

U.S. PATENT DOCUMENTS

2022/0322327 A1* 10/2022 Park .................. H04W 76/14

OTHER PUBLICATIONS

Extended European Search Report issued in corresponding European Application No. 20856633.1, mailed Apr. 29, 2022, 8 pages.
"Physical layer procedures for sidelink", R1-1905012, Source: Qualcomm Incorporated, 3GPP TSG RAN WG1 Meeting #96bis, Xian, China, Apr. 8-12, 2019, 14 pages.
"Discussion of physical layer procedures for sidelink", R1-1908287, Source: Nokia, Nokia Shanghai Bell, 3GPP TSG-RAN WG1 Meeting #98, Prague, CZ, Aug. 26-30, 2019, 7 pages.
International Search Report issued in corresponding International Application No. PCT/CN2020/110397, mailed Nov. 25, 2020, 26 pages.
PCT Written Opinion of the International Searching Authority issued in corresponding International Application No. PCT/CN2020/110397, mailed Nov. 25, 2020, 3 pages.
"Discussion of physical layer procedures for sidelink", Agenda item: 7.2.4.5, Source: Nokia, Nokia Shanghai Bell, 3GPP TSG-RAN WG1 Meeting #97, R1-1906079, Reno, USA, May 13-17, 2019, 7 pages.
"Sidelink physical layer procedures in NR V2X", Agenda Item: 7.2.4.5, Source: CATT, 3GPP TSG RAN WG1 Meeting #97, R1-1906319, Reno, USA, May 13-17, 2019, 7 pages.
"Discussion on physical layer procedure", Agenda Item: 7.2.4.1.2, Source: MediaTek Inc., 3GPP TSG RAN WG1 Meeting #95, R1-1812365, Spokane, USA, Nov. 12-16, 2018, 6 pages.
First Office Action issued in corresponding Chinese application No. 202110578714.0, mailed Aug. 9, 2022.
Second Office Action issued in corresponding Chinese application No. 202110578714.0, mailed Oct. 21, 2022.
Lenovo et al., "HARQ feedback impact on RAN2", R2-1907148, 3GPP TSG RAN WG2 #106 Reno, USA, May 13-17, 2019.
Communication Pursuant to Article 94(3) EPC issued in corresponding European Application No. 20856633.1, mailed Feb. 3, 2023, 5 pages.

* cited by examiner

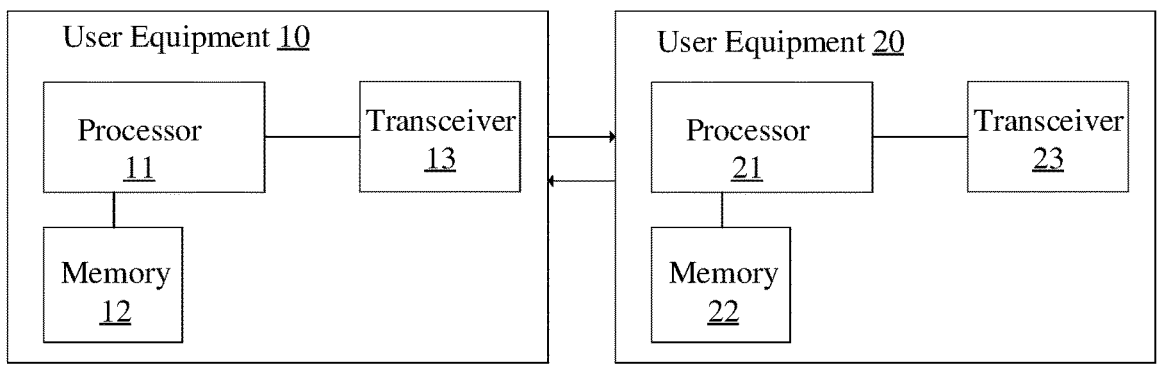

USER EQUIPMENT AND METHOD OF HYBRID AUTOMATIC REPEAT REQUEST OPTION CONFIGURATION OF SAME

CROSS-REFERENCE TO RELATED APPLICATION

This application is a continuation of International Application No. PCT/CN2020/110397, filed on Aug. 21, 2020, which claims the benefit of priority to U.S. Application No. 62/891,569, filed on Aug. 26, 2019, both of which are hereby incorporated by reference in their entireties.

BACKGROUND

The present disclosure relates to the field of communication systems, and more particularly, to a user equipment and a method of hybrid automatic repeat request (HARQ) option configuration, which can provide a good communication performance and high reliability.

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system and the like.

Meanwhile, the wireless communication system may need to estimate an uplink channel or downlink channel to transmit/receive data, to achieve system synchronization, and to feedback channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

In case of SL communication being associated with a service having requirements of high reliability or a service having requirements of relatively high reliability, sidelink (SL) hybrid automatic repeat request (HARQ) feedback operations and/or mechanism of a user equipment (UE) may be useful. For example, in case multiple UEs perform HARQ feedback transmission, collision may occur between the HARQ feedback transmissions. This may lead to a service latency (or delay). Therefore, in case multiple UEs perform HARQ feedback transmission, a method for minimizing collision and a device for supporting the same are needed.

Therefore, there is a need for a user equipment and a method of hybrid automatic repeat request (HARQ) option configuration, which can provide a good communication performance and high reliability.

SUMMARY

An object of the present disclosure is to propose a user equipment and a method of hybrid automatic repeat request (HARQ) option configuration, which can derive at least one HARQ feedback option.

In a first aspect of the present disclosure, a user equipment includes a memory, a transceiver, and a processor coupled to the memory and the transceiver. The processor is configured to derive at least one hybrid automatic repeat request (HARQ) feedback option based on at least one of the followings: group-related information from an upper layer, a radio resource control (RRC) state of the user equipment, or a coverage status of the user equipment.

In a second aspect of the present disclosure, a method of hybrid automatic repeat request (HARQ) option configuration includes deriving, by a user equipment, at least one HARQ feedback option based on at least one of the followings: group-related information from an upper layer, a radio resource control (RRC) state of the user equipment, or a coverage status of the user equipment.

In a third aspect of the present disclosure, a user equipment includes a memory, a transceiver, and a processor coupled to the memory and the transceiver. The processor is configured to acquire group-related information from an upper layer; and derive at least one hybrid automatic repeat request (HARQ) option configuration according to the group-related information.

In a fourth aspect of the present disclosure, a method of hybrid automatic repeat request (HARQ) option configuration includes acquiring, by a user equipment, group-related information from an upper layer; deriving, by the user equipment, HARQ option configuration according to the group-related information.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

In a seventh aspect of the present disclosure, a base station includes a processor and a memory configured to store a computer program. The processor is configured to execute the computer program stored in the memory to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh of the present disclosure, a computer program causes a computer to execute the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1 is a block diagram of user equipments (UEs) of communication in a communication network system according to an embodiment of the present disclosure.

FIG. 2 is a flowchart illustrating a method of hybrid automatic repeat request (HARQ) option configuration of a user equipment according to an embodiment of the present disclosure.

FIG. 3 is a block diagram of performing a hybrid automatic repeat request (HARQ) option by a user equipment according to an embodiment of the present disclosure.

DETAILED DESCRIPTION

Figure 4:
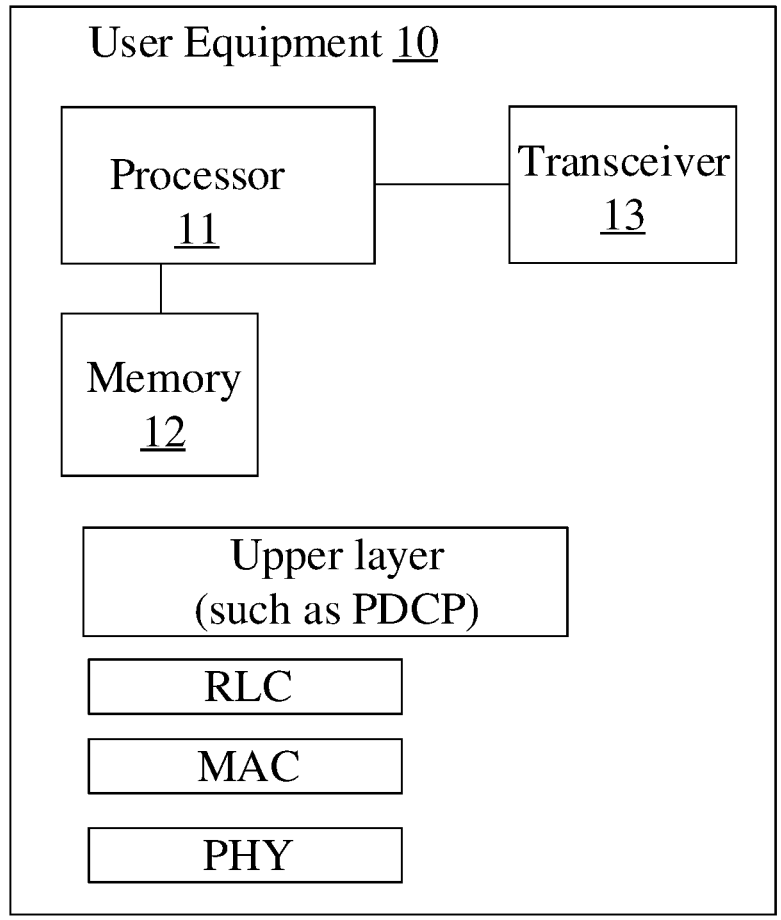
FIG. 4 is a block diagram of a user equipment according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In release 16 new radio (NR) vehicle-to-everything (V2X), 3rd generation partnership project (3GPP) may introduce two different hybrid automatic repeat request (HARQ) feedback options for V2X sidelink operation, specifically for groupcast sidelink communication.

HARQ feedback option 1: Receiver user equipment (UE) transmits negative acknowledgement (HARQ-NACK) on physical sidelink feedback channel (PSFCH) if it fails to decode the corresponding transport block (TB) after decoding the associated physical sidelink control channel (PSCCH). It transmits no signal on PSFCH otherwise.

HARQ feedback option 2: Receiver UE transmits hybrid automatic repeat request acknowledgement (HARQ-ACK) on PSFCH if it successfully decodes the corresponding TB. It transmits HARQ-NACK on PSFCH if it does not successfully decode the corresponding TB after decoding the associated PSCCH which targets the receiver UE.

However, an issue is how to select one option from the 2 different HARQ feedback options. For example, when the UE is in RRC_Connected state, it can be getting information from a RAN node configuration, via a dedicated radio resource control (RRC), since UE can report group related information to a network. That is, if the UE reports to a RAN that the number of UEs in a group is unknown, then RAN may configure HARQ feedback option 1 for this group. Otherwise, if the UE reports the RAN that the number of UEs in the group is known, then the RAN may configure the HARQ feedback option 2 for this group.

However, when the UE is in RRC_INACTIVE state, RRC_IDLE state, or out-of-coverage case, the UE needs to rely on system information block (SIB) or pre-configuration to get a related parameter, how to set a prioritized bit rate (PBR) parameter in the SIB or the pre-configuration is an issue here.

For example, for SIB, it is transmitted in a broadcast way, i.e., it cannot be configured for group-specific UE number information.

For example, for pre-configuration, it is pre-configured in the UE, i.e., it cannot know an on-going group-cast communication in the UE and the group-specific UE number information.

Therefore, some embodiments of the present disclosure are to solve issues in the prior art, derive at least one HARQ feedback option, and/or solve an issue for a UE to decide on a HARQ feedback option in case of RRC_INACTIVE, RRC_IDLE, or out-of-coverage case.

FIG. 1 illustrates that, in some embodiments, user equipments (UE) 10 and 20 of communication in a communication network system 30 according to an embodiment of the present disclosure are provided. The communication network system 30 includes the UE 10 and the UE 20. The UE 10 may include a memory 12, a transceiver 13, and a processor 11 coupled to the memory 12, the transceiver 13. The UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to derive at least one hybrid automatic repeat request (HARQ) feedback option based on at least one of the followings: group-related information from an upper layer, a radio resource control (RRC) state of the user equipment, or a coverage status of the user equipment. This can solve issues in the prior art, derive at least one HARQ feedback option, and/or solve an issue for a UE to decide on a HARQ feedback option in case of RRC_INACTIVE, RRC_IDLE, or out-of-coverage case.

FIG. 3 is a block diagram of performing a hybrid automatic repeat request (HARQ) option by a user equipment according to an embodiment of the present disclosure. FIG. 4 is a block diagram of a user equipment according to an embodiment of the present disclosure. Referring to FIG. 1, FIG. 3, and FIG. 4, in some embodiments, the processor 11 is configured to acquire group-related information from an upper layer (such as Packet Data Convergence Protocol (PDCP) layer) and derive at least one hybrid automatic repeat request (HARQ) option configuration according to the group-related information. This can solve issues in the prior art, derive at least one HARQ feedback option, and/or solve an issue for a UE to decide on a HARQ feedback option in case of RRC_INACTIVE, RRC_IDLE, or out-of-coverage case.

In some embodiments, the group-related information includes whether a number of user equipments (such as the number of the UEs 20) in a group-cast communication is known or not. In some embodiments, the group-related information includes the number of user equipments in the group-cast communication if the number of user equipments in the group-cast communication is known. In some embodiments, the at least one HARQ feedback option includes at least one of the followings: a first option: the transceiver 13 transmits a hybrid automatic repeat request negative acknowledgement (HARQ-NACK) on a physical sidelink feedback channel (PSFCH) if the processor 11 fails to decode a corresponding transport block (TB) after decoding an associated physical sidelink control channel (PSCCH); the transceiver 13 transmits no signal on the PSFCH otherwise; or a second option: the transceiver 13 transmits a hybrid automatic repeat request acknowledgement (HARQ-ACK) on the PSFCH if the processor 11 successfully decodes the corresponding TB; the transceiver 13 transmits the HARQ-NACK on the PSFCH if the processor 11 does not successfully decode the corresponding TB after decoding the associated PSCCH which targets the user equipment.

In some embodiments, when the processor 11 derives the at least one HARQ feedback option based on the group-related information from the upper layer, the processor 11 follows a rule that when a number of user equipments is unknown or known, the processor 11 selects an option of the at least one HARQ feedback option. In some embodiments, if the number of user equipments is unknown, the processor 11 selects the first option; or otherwise the processor 11 selects the second option. In some embodiments, when the processor 11 derives the at least one HARQ feedback option based on the group-related information from the upper layer, the processor 11 follows a rule that when a number of user equipments is known and is for a value, the processor 11 selects an option of the at least one HARQ feedback option.

In some embodiments, if the number of user equipments is known and ranges between a first value and a second value, the processor 11 selects the second option; or otherwise the processor 11 selects the first option. In some embodiments, the processor 11 is further configured to combine with a quality of service (QoS) characteristic to decide on the HARQ feedback option. In some embodiments, the QoS characteristic includes at least one of the followings: a quasi co-location indicator (PQI), a resource type, a priority level, a packet delay budget, a packet error rate, an averaging window, or a maximum data burst volume. In some embodiments, the resource type includes a guaranteed bit rate (GBR), a delay critical GBR, or a non-GBR. In some embodiments, the averaging window is for GBR and delay-critical GBR resource type only. In some embodiments, the maximum data burst volume is for delay-critical GBR resource type only.

In some embodiments, for specific PQI values, the processor 11 selects the first option; or otherwise the processor 11 selects the second option. In some embodiments, for a specific priority level, the processor 11 selects the first option; or otherwise the processor 11 selects the second option. In some embodiments, when the processor 11 derives the at least one HARQ feedback option based on the group-related information from the upper layer, the processor 11 follows a rule specified in a specification, in a pre-configuration, or in a system information block (SIB). In some embodiments, when the processor 11 derives the at least one HARQ feedback option based on the RRC state of the user equipment 10 or the coverage status of the user equipment 10, the processor 11 follows a rule that when a number of user equipments is unknown or known, the processor 11 selects an option of the at least one HARQ feedback option. In some embodiments, when the user equipment 10 is in out of coverage, the processor 11 selects the first option. In some embodiments, when the user equipment 10 is in an RRC idle state or an RRC inactive state, the processor 11 selects the first option.

In some embodiments, the group-related information includes whether a number of user equipments in a group-cast communication is known or not. In some embodiments, the group-related information includes a number of user equipments in a group-cast communication if the number of user equipments in the group-cast communication is known. In some embodiments, the at least one HARQ feedback option includes: at least one of HARQ-NACK only option or HARQ-NACK/ACK option. In some embodiments, the HARQ-NACK only option includes: transmitting, by the transceiver 13, a hybrid automatic repeat request negative acknowledgement (HARQ-NACK) if the processor 11 fails to decode a corresponding transport block (TB). In some embodiments, the HARQ-NACK only option includes: transmitting, by the transceiver 13, a hybrid automatic repeat request negative acknowledgement (HARQ-NACK) on a physical sidelink feedback channel (PSFCH) if the processor 11 fails to decode a corresponding transport block (TB) after decoding an associated physical sidelink control channel (PSCCH). In some embodiments, the HARQ-NACK only option includes: transmitting, by the transceiver 13, a hybrid automatic repeat request negative acknowledgement (HARQ-NACK) if the processor 11 fails to decode a corresponding transport block (TB).

In some embodiments, the HARQ-NACK only option includes: transmitting, by the transceiver 13, no signal if the processor 11 successfully decodes a corresponding transport block (TB). In some embodiments, the HARQ-NACK only option includes: transmitting, by the transceiver 13, no signal on PSFCH if the processor 11 successfully decodes a corresponding transport block (TB). In some embodiments, the HARQ-NACK/ACK option includes: transmitting, by the transceiver 13, a hybrid automatic repeat request acknowledgement (HARQ-ACK) if the processor 11 successfully decodes a corresponding TB. In some embodiments, the HARQ-NACK/ACK option includes: transmitting, by the transceiver 13, a hybrid automatic repeat request acknowledgement (HARQ-ACK) on PSFCH if the processor 11 successfully decodes a corresponding TB. In some embodiments, the HARQ-NACK/ACK option includes: transmitting, by the transceiver 13, the HARQ-NACK on PSFCH if the processor 11 fails to decode a corresponding TB after decoding an associated PSCCH which targets the user equipment 10. In some embodiments, the processor 11 selects HARQ-NACK only option when a number of user equipments is unknown. In some embodiments, the processor 11 selects HARQ-NACK/ACK option when a number of user equipments is known.

FIG. 2 illustrates a method 200 of hybrid automatic repeat request (HARQ) option configuration of a UE according to an embodiment of the present disclosure. In some embodiments, the method 200 includes: a block 202, deriving, by a user equipment, at least one HARQ feedback option based on at least one of the followings: group-related information from an upper layer, a radio resource control (RRC) state of the user equipment, or a coverage status of the user equipment. This can solve issues in the prior art, derive at least one HARQ feedback option, and/or solve an issue for a UE to decide on a HARQ feedback option in case of RRC_INACTIVE, RRC_IDLE, or out-of-coverage case.

Figure 5:
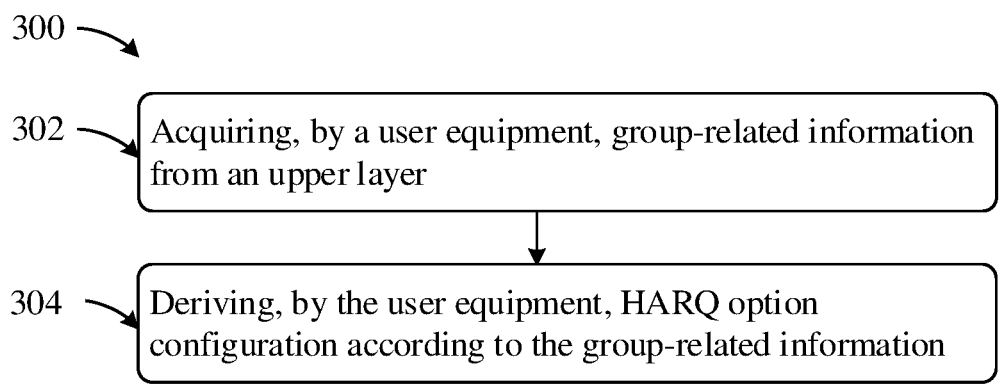
FIG. 5 is a flowchart illustrating a method of hybrid automatic repeat request (HARQ) option configuration of a user equipment according to another embodiment of the present disclosure.

FIG. 5 illustrates a method 300 of hybrid automatic repeat request (HARQ) option configuration of a user equipment according to another embodiment of the present disclosure. In some embodiments, the method 300 includes: a block 302, acquiring, by a user equipment, group-related information from an upper layer; and a block 304, deriving, by the user equipment, HARQ option configuration according to the group-related information. This can solve issues in the prior art, derive at least one HARQ feedback option, and/or solve an issue for a UE to decide on a HARQ feedback option in case of RRC_INACTIVE, RRC_IDLE, or out-of-coverage case.

In some embodiments, the group-related information includes whether a number of user equipments in a group-cast communication is known or not. In some embodiments, the group-related information includes the number of user equipments in the group-cast communication if the number of user equipments in the group-cast communication is known. In some embodiments, the at least one HARQ feedback option includes at least one of the followings: a first option: the user equipment transmits a hybrid automatic repeat request negative acknowledgement (HARQ-NACK) on a physical sidelink feedback channel (PSFCH) if the user equipment fails to decode a corresponding transport block (TB) after decoding an associated physical sidelink control channel (PSCCH); the user equipment transmits no signal on the PSFCH otherwise; or a second option: the user equipment transmits a hybrid automatic repeat request acknowledgement (HARQ-ACK) on the PSFCH if the user equipment successfully decodes the corresponding TB; the user equipment transmits the HARQ-NACK on the PSFCH if the user equipment does not successfully decode the corresponding TB after decoding the associated PSCCH which targets the user equipment.

In some embodiments, when the user equipment derives the at least one HARQ feedback option based on the group-related information from the upper layer, the user equipment follows a rule that when a number of user equipments is unknown or known, the user equipment selects an option of the at least one HARQ feedback option. In some embodiments, if the number of user equipments is unknown, the user equipment selects the first option; or otherwise the user equipment selects the second option. In some embodiments, when the user equipment derives the at least one HARQ feedback option based on the group-related information from the upper layer, the user equipment follows a rule that when a number of user equipments is known and is for a value, the user equipment selects an option of the at least one HARQ feedback option.

In some embodiments, if the number of user equipments is known and ranges between a first value and a second value, the user equipment selects the second option; or otherwise the user equipment selects the first option. In some embodiments, the user equipment is further configured to combine with a quality of service (QoS) characteristic to decide on the HARQ feedback option. In some embodiments, the QoS characteristic includes at least one of the followings: a quasi co-location indicator (PQI), a resource type, a priority level, a packet delay budget, a packet error rate, an averaging window, or a maximum data burst volume.

In some embodiments, the resource type includes a guaranteed bit rate (GBR), a delay critical GBR, or a non-GBR. In some embodiments, the averaging window is for GBR and delay-critical GBR resource type only. In some embodiments, the maximum data burst volume is for delay-critical GBR resource type only. In some embodiments, for specific PQI values, the user equipment selects the first option; or otherwise the user equipment selects the second option. In some embodiments, for a specific priority level, the user equipment selects the first option; or otherwise the user equipment selects the second option.

In some embodiments, when the user equipment derives the at least one HARQ feedback option based on the group-related information from the upper layer, the user equipment follows a rule specified in a specification, in a pre-configuration, or in a system information block (SIB). In some embodiments, when the user equipment derives the at least one HARQ feedback option based on the RRC state of the user equipment or the coverage status of the user equipment, the user equipment follows a rule that when a number of user equipments is unknown or known, the user equipment selects an option of the at least one HARQ feedback option. In some embodiments, when the user equipment is in out of coverage, the user equipment selects the first option. In some embodiments, when the user equipment is in an RRC idle state or an RRC inactive state, the user equipment selects the first option.

In some embodiments, the group-related information includes whether a number of user equipments in a group-cast communication is known or not. In some embodiments, the group-related information includes a number of user equipments in a group-cast communication if the number of user equipments in the group-cast communication is known. In some embodiments, the at least one HARQ feedback option includes: at least one of HARQ-NACK only option or HARQ-NACK/ACK option. In some embodiments, the HARQ-NACK only option includes: transmitting, by the user equipment, a hybrid automatic repeat request negative acknowledgement (HARQ-NACK) if the user equipment fails to decode a corresponding transport block (TB). In some embodiments, the HARQ-NACK only option includes: transmitting, by the user equipment, a hybrid automatic repeat request negative acknowledgement (HARQ-NACK) on a physical sidelink feedback channel (PSFCH) if the user equipment fails to decode a corresponding transport block (TB) after decoding an associated physical sidelink control channel (PSCCH). In some embodiments, the HARQ-NACK only option includes: transmitting, by the user equipment, a hybrid automatic repeat request negative acknowledgement (HARQ-NACK) if the user equipment fails to decode a corresponding transport block (TB). In some embodiments, the HARQ-NACK only option includes: transmitting, by the user equipment, no signal if the user equipment successfully decodes a corresponding transport block (TB).

In some embodiments, the HARQ-NACK only option includes: transmitting, by the user equipment, no signal on PSFCH if the user equipment successfully decodes a corresponding transport block (TB). In some embodiments, the HARQ-NACK/ACK option includes: transmitting, by the user equipment, a hybrid automatic repeat request acknowledgement (HARQ-ACK) if the user equipment successfully decodes a corresponding TB. In some embodiments, the HARQ-NACK/ACK option includes: transmitting, by the user equipment, a hybrid automatic repeat request acknowledgement (HARQ-ACK) on PSFCH if the user equipment successfully decodes a corresponding TB. In some embodiments, the HARQ-NACK/ACK option includes: transmitting, by the user equipment, the HARQ-NACK on PSFCH if the user equipment fails to decode a corresponding TB after decoding an associated PSCCH which targets the user equipment. In some embodiments, the method includes selecting, by the user equipment, HARQ-NACK only option when the number of user equipments is unknown. In some embodiments, the method includes selecting, by the user equipment, HARQ-NACK/ACK option when the number of user equipments is known.

In an embodiment: a UE derive at least one HARQ feedback option from upper layer information.

Two different hybrid automatic repeat request (HARQ) feedback options for V2X sidelink operation, specifically for groupcast sidelink communication are provided in the following.

HARQ feedback option 1: Receiver user equipment (UE) transmits negative acknowledgement (HARQ-NACK) on physical sidelink feedback channel (PSFCH) if it fails to decode the corresponding transport block (TB) after decoding the associated physical sidelink control channel (PSCCH). It transmits no signal on PSFCH otherwise.

HARQ feedback option 2: Receiver UE transmits hybrid automatic repeat request acknowledgement (HARQ-ACK) on PSFCH if it successfully decodes the corresponding TB. It transmits HARQ-NACK on PSFCH if it does not successfully decode the corresponding TB after decoding the associated PSCCH which targets the receiver UE.

In this embodiment, for information from an upper layer, it includes but not limited to the following group-cast related information: Whether the number of UEs in a group-cast communication is known or not. What the number of UEs is, in a group-cast communication, if it is known. Based on this information, the UE derives a HARQ feedback option parameter, e.g., for each group, based on group-cast related information. That is, if the number of UEs is unknown, the UE selects the HARQ feedback option 1, else, the UE selects the HARQ feedback option 2. If the number of UEs in known and within a range [A, B], i.e., the number of UEs is equal to and/or more than A, and equal to and/or less than B, the UE selects the HARQ feedback option 2, otherwise, the UE selects the HARQ feedback option 1.

In addition, the UE can combine with a QoS characteristic to decide on the HARQ feedback option, where the QoS characteristic (PQI) includes: resource type (GBR, delay critical GBR or non-GBR); priority level; packet delay budget; packet error rate; averaging window (for GBR and delay-critical GBR resource type only); or maximum data burst volume (for delay-critical GBR resource type only). In one embodiment, for specific PQI values, the UE selects the HARQ feedback option 1, otherwise, the UE selects the HARQ feedback option 2. In one embodiment, for the specific priority level, the UE selects the HARQ feedback option 1, otherwise, the UE select HARQ feedback option 2. The above rule and criterion are specified in the specification.

In another embodiment: a UE derives at least one HARQ feedback option from upper layer information and pre-configuration/SIB.

Two different hybrid automatic repeat request (HARQ) feedback options for V2X sidelink operation, specifically for groupcast sidelink communication are provided in the following.

HARQ feedback option 1: Receiver user equipment (UE) transmits negative acknowledgement (HARQ-NACK) on physical sidelink feedback channel (PSFCH) if it fails to decode the corresponding transport block (TB) after decoding the associated physical sidelink control channel (PSCCH). It transmits no signal on PSFCH otherwise.

HARQ feedback option 2: Receiver UE transmits hybrid automatic repeat request acknowledgement (HARQ-ACK) on PSFCH if it successfully decodes the corresponding TB. It transmits HARQ-NACK on PSFCH if it does not successfully decode the corresponding TB after decoding the associated PSCCH which targets the receiver UE.

In this embodiment, for information from an upper layer, it includes but not limited to the following group-cast related information: Whether the number of UEs in a group-cast communication is known or not. What the number of UEs is, in a group-cast communication, if it is known. Based on this information, the UE derives a HARQ feedback option parameter, e.g., for each group, based on the group-cast related information and SIB/pre-configuration. That is, SIB/pre-configuration can indicate the HARQ feedback option, i.e., the HARQ feedback option 1 or the HARQ feedback option 2 when the number of UEs is unknown or when the number of UEs is known.

Furthermore, when the number of UEs is for specific value(s), value ranges, e.g., if the number of UEs in known and within a range [A, B], i.e., the number of UEs is equal to and/or more than A, and equal to and/or less than B, the UE selects the HARQ feedback option 2, otherwise, the UE selects the HARQ feedback option 1.

In addition, SIB/pre-configuration can further indicate the HARQ feedback option selection considering the QoS characteristic, where the QoS characteristic (PQI) includes: resource type (GBR, delay critical GBR or non-GBR); priority level; packet delay budget; packet error rate; averaging window (for GBR and delay-critical GBR resource type only); or maximum data burst volume (for delay-critical GBR resource type only). In one embodiment, the selected HARQ feedback option, i.e., the HARQ feedback option 1 or the HARQ feedback option 2 can be for specific PQI values or for specific priority level. The UE selects the HARQ feedback option, by checking the rule/criterion defined by pre-configuration/SIB.

In another embodiment: a UE derives at least one HARQ feedback option based on RRC state and/or coverage status. The UE selects the HARQ feedback option 1 when the UE is in out of coverage case, RRC_IDLE state, or RRC_INACTIVE state.

Figure 6:
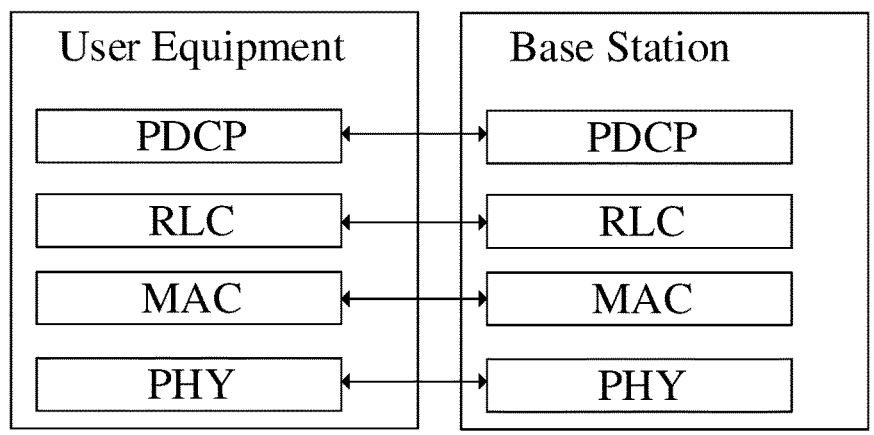
FIG. 6 is a radio protocol architecture of a user plane according to an embodiment of the present disclosure.
Figure 7:
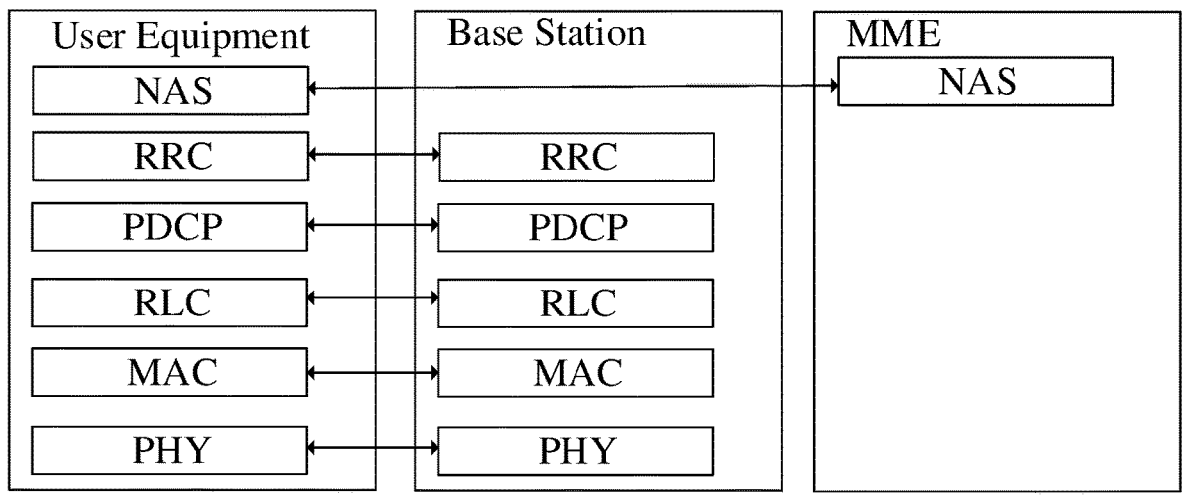
FIG. 7 is a radio protocol architecture of a control plane according to an embodiment of the present disclosure.

FIG. 6 illustrates a radio protocol architecture of a user plane according to an embodiment of the present disclosure. FIG. 7 illustrates a radio protocol architecture of a control plane according to an embodiment of the present disclosure. The user plane is a protocol stack for user data transmission, and the control plane is a protocol stack for control signal transmission.

FIG. 2 and FIG. 6 illustrate that, in some embodiments, a physical (PHY) layer belongs to the L1. A physical (PHY)

layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of radio link control service data unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ). The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data. The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released. Downlink transport channels transmitting (or transporting) data from a network to a UE include a broadcast channel (BCH) transmitting system information and a downlink shared channel (SCH) transmitting other user traffic or control messages. Traffic or control messages of downlink multicast or broadcast services may be transmitted via the downlink SCH or may be transmitted via a separate downlink multicast channel (MCH). Meanwhile, uplink transport channels transmitting (or transporting) data from a UE to a network include a random access channel (RACH) transmitting initial control messages and an uplink shared channel (SCH) transmitting other user traffic or control messages.

Logical channels existing at a higher level than the transmission channel and being mapped to the transmission channel may include a broadcast control channel (BCCH), a paging control channel (PCCH), a common control channel (CCCH), a multicast control channel (MCCH), a multicast traffic channel (MTCH), and so on. A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a physical downlink control channel (PDCCH), i.e., L1/L2 control channels. A transmission time interval (TTI) refers to a unit time of a subframe transmission.

In summary, in some embodiments of the present disclosure, the UE derives at least one HARQ feedback option based on group-related information from the upper layer. For the group-related information from the upper layer, it includes but not limited to: Whether the number of UEs in a group-cast communication is known or not or what the number of UEs is, in a group-cast communication, if it is known. For the at least one HARQ feedback option, it includes but not limited to: Option 1: Receiver UE transmits HARQ-NACK on PSFCH if it fails to decode the corresponding TB after decoding the associated PSCCH. It transmits no signal on PSFCH otherwise. Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. When the UE derive the at least one HARQ feedback option based on group-related information from the upper layer, it follows a rule that: When the number of UEs is unknown or known, the UE selects a specific HARQ option; when the number of UEs is known and is for specific value (of number of UEs), the UE selects a specific HARQ option, the rule is specified in specification; the rule is specified in pre-configuration; or the rule is specified in SIB. The UE derives the HARQ feedback option based on RRC state and/or coverage status. This can solve issues in the prior art, derive at least one HARQ feedback option, and/or solve an issue for a UE to decide on a HARQ feedback option in case of RRC_INACTIVE, RRC_IDLE, or out-of-coverage case.

Commercial interests for some embodiments are as follows. 1. Solving issues in the prior art. 2. Deriving at least one HARQ feedback option. 3. Solving an issue for a UE to decide on a HARQ feedback option in case of RRC_INACTIVE, RRC_IDLE, or out-of-coverage case. 4. Providing good communication performance. 5. Providing high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 8:
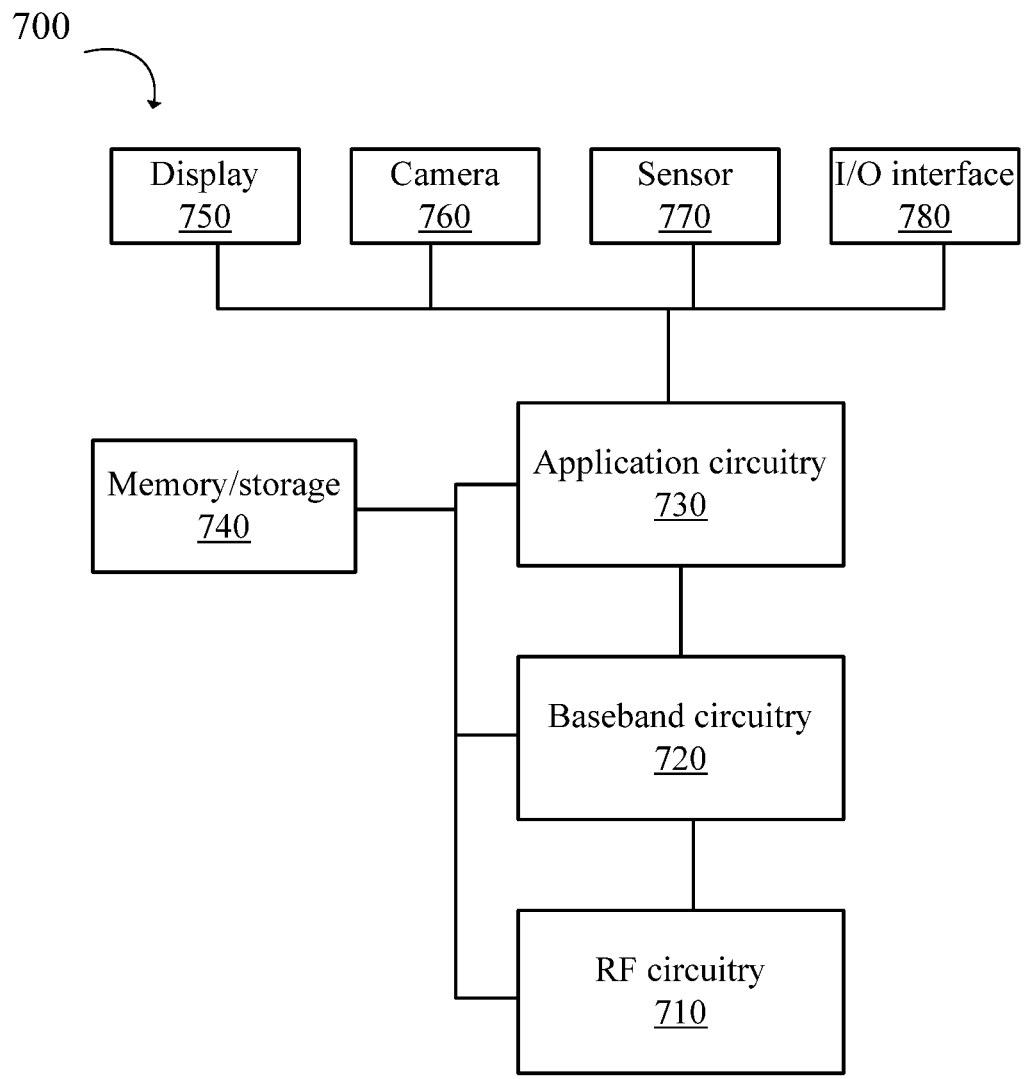
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in some embodiments, it is understood that the present disclosure is not limited to the disclosed embodiments but is intended to cover various arrangements made without departing from the scope of the broadest interpretation of the appended claims.

What is claimed is:

1. A user equipment, comprising:
a memory;
a transceiver; and
a processor coupled to the memory and the transceiver, wherein the processor is configured to derive at least one hybrid automatic repeat request (HARQ) feedback option based on at least one of the following:
group-related information from an upper layer;
a radio resource control (RRC) state of the user equipment; or
a coverage status of the user equipment;
wherein the at least one HARQ feedback option comprises at least one of the following:
a first option, wherein the transceiver is configured to transmit a hybrid automatic repeat request negative acknowledgement (HARQ-NACK) on a physical sidelink feedback channel (PSFCH) if the processor fails to decode a corresponding transport block (TB) after decoding an associated physical sidelink control channel (PSCCH) and the transceiver is configured to transmit no signal on the PSFCH otherwise; or
a second option, wherein the transceiver is configured to transmit a hybrid automatic repeat request acknowledgement (HARQ-ACK) on the PSFCH if the processor successfully decodes the corresponding TB, and the transceiver is configured to transmit the HARQ-NACK on the PSFCH if the processor does not successfully decode the corresponding TB after decoding the associated PSCCH which targets the user equipment;
wherein when the processor derives the at least one HARQ feedback option based on the group-related information from the upper layer, the processor is configured to follow a rule that when a number of user equipments is unknown or known, the processor is configured to select an option of the at least one HARQ feedback option;
wherein when the number of user equipments is unknown, the processor is configured to select the first option.

2. The user equipment of claim 1, wherein the group-related information comprises whether a number of user equipments in a group-cast communication is known or not.

3. The user equipment of claim 2, wherein the group-related information comprises the number of user equipments in the group-cast communication if the number of user equipments in the group-cast communication is known.

4. The user equipment of claim 1, wherein when the number of the user equipments is known, the processor is configured to select the second option.

5. The user equipment of claim 1, wherein when the processor derives the at least one HARQ feedback option based on the group-related information from the upper layer, the processor is configured to follow a rule that when a number of user equipments is known and is for a value, the processor is configured to select an option of the at least one HARQ feedback option.

6. The user equipment of claim 5, wherein if the number of user equipments is known and ranges between a first value and a second value, the processor is configured to select the second option, or otherwise the processor is configured to select the first option.

7. The user equipment of claim 1, wherein the processor is further configured to combine with a quality of service (QOS) characteristic to decide on the HARQ feedback option.

8. The user equipment of claim 7, wherein the QoS characteristic comprises at least one of the following:
a quasi co-location indicator (PQI);
a resource type;
a priority level;
a packet delay budget;
a packet error rate;
an averaging window; or
a maximum data burst volume.

9. The user equipment of claim 8, wherein the resource type comprises a guaranteed bit rate (GBR), a delay critical GBR, or a non-GBR.

10. The user equipment of claim 8, wherein the averaging window is for GBR and delay-critical GBR resource type only.

11. The user equipment of claim 8, wherein the maximum data burst volume is for delay-critical GBR resource type only.

12. The user equipment of claim 8, wherein when a POI value is a specific value, the processor is configured to select the first option; or when the PQI value is not the specific value, the processor is configured to select the second option.

13. The user equipment of claim 8, wherein when the priority level is a specific level, the processor is configured to select the first option; or when the priority level is not the specific value, the processor is configured to select the second option.

14. The user equipment of claim 1, wherein when the processor derives the at least one HARQ feedback option based on the group-related information from the upper layer, the processor is configured to follow a rule specified in a specification, in a pre-configuration, or in a system information block (SIB).

15. The user equipment of claim 1, wherein when the processor derives the at least one HARQ feedback option based on the RRC state of the user equipment or the coverage status of the user equipment, the processor is configured to follow a rule that when a number of user equipments is unknown or known, the processor is configured to select an option of the at least one HARQ feedback option.

16. The user equipment of claim 15, wherein when the user equipment is in out of coverage case, the processor is configured to select the first option.

17. A method for hybrid automatic repeat request (HARQ) option configuration, comprising deriving, by a user equipment, at least one HARQ feedback option based on at least one of the following:
  group-related information from an upper layer;
  a radio resource control (RRC) state of the user equipment; or
  a coverage status of the user equipment;
  wherein the at least one HARQ feedback option comprises at least one of the following:
  a first option, wherein the user equipment transmits a hybrid automatic repeat request negative acknowledgement (HARQ-NACK) on a physical sidelink feedback channel (PSFCH) if the user equipment fails to decode a corresponding transport block (TB) after decoding an associated physical sidelink control channel (PSCCH) and transmits no signal on the PSFCH otherwise; or
  a second option, wherein the user equipment transmits a hybrid automatic repeat request acknowledgement (HARQ-ACK) on the PSFCH if the user equipment successfully decodes the corresponding TB, and the transceiver is configured to transmit the HARQ-NACK on the PSFCH if the processor does not successfully decode the corresponding TB after decoding the associated PSCCH which targets the user equipment;
  wherein when the processor derives the at least one HARQ feedback option based on the group-related information from the upper layer, the user equipment follows a rule that when a number of user equipments is unknown or known, and the user equipment selects an option of the at least one HARQ feedback option;
  wherein when the number of user equipments is unknown, the user equipment selects the first option.

18. A non-transitory machine-readable storage medium having instructions stored thereon that when executed by a user equipment, cause the user equipment to perform deriving at least one hybrid automatic repeat request (HARQ) feedback option based on at least one of the following:
  group-related information from an upper layer;
  a radio resource control (RRC) state of the user equipment; or
  a coverage status of the user equipment;
  wherein the at least one HARQ feedback option comprises at least one of the following:
  a first option, wherein the user equipment transmits a hybrid automatic repeat request negative acknowledgement (HARQ-NACK) on a physical sidelink feedback channel (PSFCH) if the user equipment fails to decode a corresponding transport block (TB) after decoding an associated physical sidelink control channel (PSCCH) and transmits no signal on the PSFCH otherwise; or
  a second option, wherein the user equipment transmits a hybrid automatic repeat request acknowledgement (HARQ-ACK) on the PSFCH if the user equipment successfully decodes the corresponding TB, and the transceiver is configured to transmit the HARQ-NACK on the PSFCH if the processor does not successfully decode the corresponding TB after decoding the associated PSCCH which targets the user equipment;
  wherein when the processor derives the at least one HARQ feedback option based on the group-related information from the upper layer, the user equipment follows a rule that when a number of user equipments is unknown or known, and the user equipment selects an option of the at least one HARQ feedback option;
  wherein when the number of user equipments is unknown, the user equipment selects the first option.

* * * * *